United States Patent

Oishi et al.

(10) Patent No.: US 9,631,983 B2
(45) Date of Patent: Apr. 25, 2017

(54) OPTICAL FIBER TEMPERATURE DISTRIBUTION MEASURING DEVICE

(71) Applicant: YOKOGAWA ELECTRIC CORPORATION, Musashino-shi, Tokyo (JP)

(72) Inventors: Kazushi Oishi, Musashino (JP); Teruaki Umeno, Musashino (JP)

(73) Assignee: Yokogawa Electric Corporation, Musashino-shi, Tokyo (JP)

(*) Notice: Subject to any disclaimer, the term of this patent is extended or adjusted under 35 U.S.C. 154(b) by 0 days.

(21) Appl. No.: 14/708,744

(22) Filed: May 11, 2015

(65) Prior Publication Data
US 2015/0330844 A1 Nov. 19, 2015

(30) Foreign Application Priority Data
May 13, 2014 (JP) ................. 2014-099773

(51) Int. Cl.
G01N 21/00 (2006.01)
G01K 11/32 (2006.01)
G01M 11/00 (2006.01)
G01K 15/00 (2006.01)

(52) U.S. Cl.
CPC ........... *G01K 11/32* (2013.01); *G01K 15/005* (2013.01); *G01M 11/3109* (2013.01); *G01K 2011/324* (2013.01)

(58) Field of Classification Search
CPC combination set(s) only.
See application file for complete search history.

(56) References Cited

U.S. PATENT DOCUMENTS

| 6,237,421 | B1 | 5/2001 | Li et al. | |
|---|---|---|---|---|
| 2005/0140966 | A1 | 6/2005 | Yamate et al. | |
| 2008/0232425 | A1 | 9/2008 | Hall et al. | |
| 2009/0240455 | A1 | 9/2009 | Fromme et al. | |
| 2011/0310925 | A1* | 12/2011 | Agawa | G01K 11/32 374/161 |
| 2013/0100984 | A1* | 4/2013 | Agawa | G01K 11/32 374/161 |

FOREIGN PATENT DOCUMENTS

| JP | 2000-74697 A | 3/2000 |
|---|---|---|
| JP | 2008-512663 A | 4/2008 |
| JP | 2012-27001 A | 2/2012 |
| JP | 2012-52952 A | 3/2012 |

OTHER PUBLICATIONS

Communication issued on Sep. 28, 2015 by the European Patent Office in related Application No. 15167087.4.

\* cited by examiner

*Primary Examiner* — Tri T Ton
(74) *Attorney, Agent, or Firm* — Sughrue Mion, PLLC (57) ABSTRACT

An optical fiber temperature distribution measuring device measures a temperature distribution along an optical fiber by using backward Raman scattering light generated in the optical fiber. The device includes an arithmetic controller that changes a plurality of calibration parameters in conjunction with each other on the basis of a measured temperature value and a reference temperature value at a to-be-measured point, thereby converging a calibrated value of the measured temperature to a true value.

8 Claims, 9 Drawing Sheets

| CALIBRATION PATTERN | POSITION | TEMPERATURE | NUMBER OF TIMES OF MEASUREMENTS |
|---|---|---|---|
| CASE 1-1 | THREE POSITIONS | THREE-POINT | ONE TIME |
| CASE 1-2 | THREE POSITIONS | TWO-POINT | ONE TIME |
| CASE 2-1 | TWO POSITIONS | THREE-POINT | TWO TIMES |
| CASE 2-2 | TWO POSITIONS | TWO-POINT | TWO TIMES |

OPTICAL FIBER TEMPERATURE DISTRIBUTION MEASURING DEVICE

CROSS-REFERENCE TO RELATED APPLICATION

The present application claims priority from Japanese Patent Application No. 2014-099773 filed on May 13, 2014, the entire content of which is incorporated herein by reference.

BACKGROUND

The present invention relates to an optical fiber temperature distribution measuring device using backward Raman scattering light, and more particularly, to temperature calibration.

A temperature measuring device configured to measure a temperature distribution along an optical fiber has been known as a kind of a distribution type measuring device using an optical fiber as a sensor. In the technology, backward scattering light occurring in the optical fiber is used.

The backward scattering light includes Rayleigh scattering light, Brillouin scattering light, Raman scattering light and the like. Backward Raman scattering light having high temperature dependence is used for temperature measurement. The backward Raman scattering light is wavelength-divided to measure the temperature. The backward Raman scattering light includes anti-Stokes light AS having a shorter wavelength than incident light and Stokes light ST having a longer wavelength that incident light.

An optical fiber temperature distribution measuring device is configured to measure an anti-Stokes light intensity Ias and an Stokes light intensity Ist, to calculate a temperature from an intensity ratio thereof and to display a temperature distribution along the optical fiber, and is used in fields of temperature management of a plant facility, research and studying relating to disaster prevention, air conditioning of a power plant and a large building, and the like.

Figure 5:
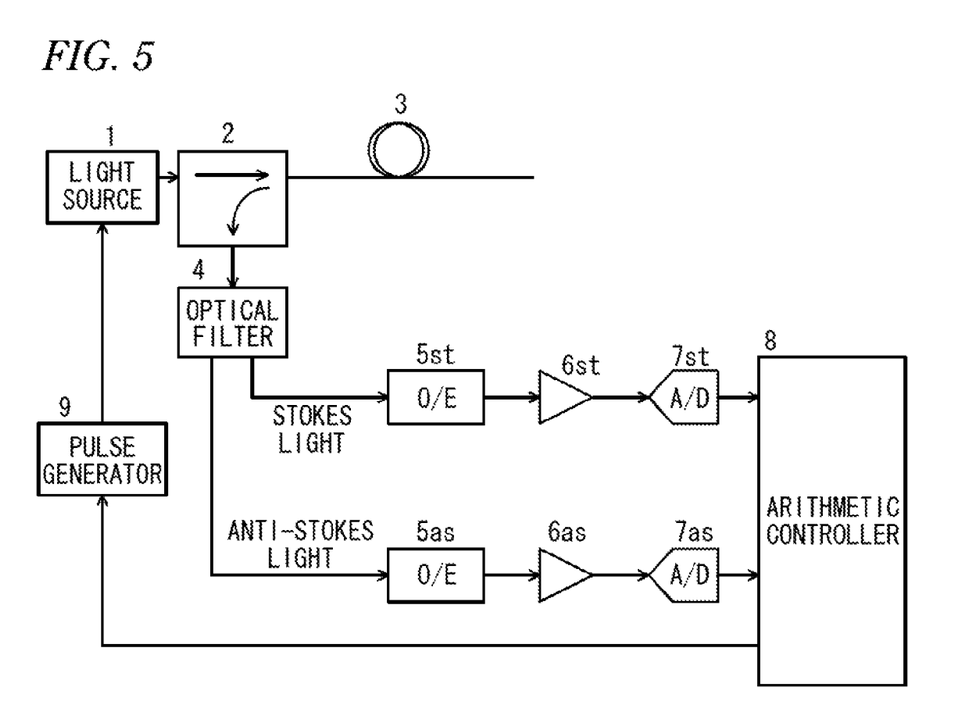
FIG. 5 is a block diagram showing a basic configuration example of an optical fiber temperature distribution measuring device.

FIG. 5 is a block diagram showing a basic configuration example of the optical fiber temperature distribution measuring device. In FIG. 5, a light source 1 is connected to an incidence end of an optical demultiplexer 2, an optical fiber 3 is connected to an incidence/emission end of the optical demultiplexer 2, a photoelectric converter (hereinafter, referred to as O/E converter) 5st is connected to one emission end of the optical demultiplexer 2 through an optical filter 4, and an O/E converter 5as is connected to the other emission end of the optical demultiplexer 2 through the optical filter 4.

An output terminal of the O/E converter 5st is connected to an arithmetic controller 8 through an amplifier 6st and an A/D converter 7st, and an output terminal of the O/E converter 5as is connected to the arithmetic controller 8 through an amplifier 6as and an A/D converter 7as. In the meantime, the arithmetic controller 8 is connected to the light source 1 through a pulse generator 9.

As the light source 1, a laser diode is used, for example. The light source 1 is configured to emit pulse light in synchronization with a timing signal, which is supplied from the arithmetic controller 8 via the pulse generator 9. The pulse light emitted from the light source 1 is incident to the incidence end of the optical demultiplexer 2. The optical demultiplexer 2 is configured to emit the pulse light emitted from the incidence/emission end thereof to the optical fiber 3, to receive a backward Raman scattering light generated in the optical fiber 3 at the incidence/emission end thereof and to wavelength-divide the same into Stokes light and anti-Stokes light. The pulse light emitted from the optical demultiplexer 2 is incident to the incidence end of the optical fiber 3, and the backward Raman scattering light generated in the optical fiber 3 is emitted from the incidence end of the optical fiber 3 towards the optical demultiplexer 2.

As the O/E converters 5st, 5as, photo diodes are used, for example. The Stokes light emitted from one emission end of the optical filter 4 is incident to the O/E converter 5st and the anti-Stokes light emitted from the other emission end of the optical filter 4 is incident to the O/E converter 5as, so that electric signals corresponding to the incident lights are respectively output.

The amplifiers 6st, 6as are configured to amplify the electric signals output from the O/E converters 5st, 5as, respectively. The A/D converters 7st, 7as are configured to convert the signals output from the amplifiers 6st, 6as into digital signals, respectively.

The arithmetic controller 8 is configured to calculate a temperature from an intensity ratio of two components, i.e., Stokes light and anti-Stokes light of the backward scattering light, based on the digital signals output from the A/D converters 7st, 7as, and to display a temperature distribution along the optical fiber 3 over time on a display means (not shown). In the meantime, a relation between the intensity ratio and the temperature is beforehand stored in form of a table or formula in the arithmetic controller 8. Also, the arithmetic controller 8 is configured to transmit a timing signal to the light source 1, thereby controlling the timing of the pulse light emitted from the light source 1.

A principle of the temperature distribution measurement is described. Since the light speed in the optical fiber 3 is already known, a time function representing the signal intensity of each of Stokes light and anti-Stokes light with light emitting timing of the light source 1 as a reference cm be converted into a function of a distance along the optical fiber 3 as measured from the light source 1, that is, a distance distribution in which a horizontal axis represents the distance and a vertical axis represents an intensity of each of Stokes light and anti-Stokes light generated at each distance point in the optical fiber.

In the meantime, both the anti-Stokes light intensity Ias and the Stokes light intensity Ist depend on the temperature of the optical fiber 3, and the intensity ratio Ias/Ist of both the lights also depends on the temperature of the optical fiber 3. Therefore, if the intensity ratio Ias/Ist is known, it is possible to obtain a temperature at a position at which the Raman scattering light is generated. Here, since the intensity ratio Ias/Ist is a function of the distance x, i.e., Ias(x)/Ist(x), it is possible to obtain a temperature distribution T(x) along the optical fiber 3 from the intensity ratio Ias(x)/Ist(x).

Figure 6:
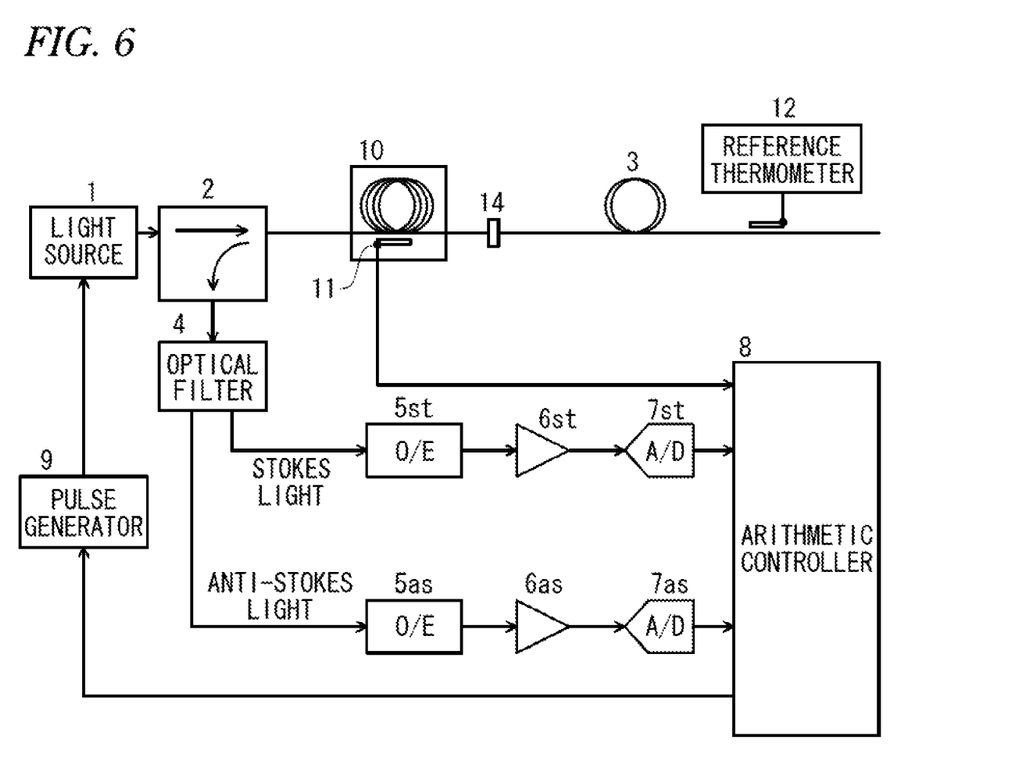
FIG. 6 is a block diagram showing an example of an optical fiber temperature distribution measuring device of the related art.

FIG. 6 is a block diagram showing an example of the optical fiber temperature distribution measuring device of the related art. In FIG. 6, the same parts as those of FIG. 5 are denoted with the same reference numerals.

In FIG. 6, a temperature reference unit 10 having a rolled-up optical fiber of several tens of meters is provided between the optical demultiplexer 2 and the optical fiber 3 through a connector connection unit 14. The temperature reference unit 10 is provided with a thermometer 11 made of a platinum temperature measuring resistor, for example, and configured to measure an actual temperature. An output signal of the thermometer 11 is input to the arithmetic controller 8. In the meantime, a reference thermometer 12 made of a platinum temperature measuring resistor, for example, and configured to measure an actual temperature is also provided in the vicinity of the optical fiber 3 used as a temperature sensor.

In the above configuration, a temperature T(K) of a to-be-measured point is calculated by an equation (1), based on the anti-Stokes light (AS) and the Stokes light (ST).

$$T = \frac{hc\Delta v_0}{k} \left( \frac{1}{-\ell n R(T) + \ell n R(T_0) + \frac{hc\Delta v_0}{k} * \frac{1}{T_0}} \right) \quad (1)$$

T: temperature [K] of to-be-measured point
$T_0$: temperature [K] of temperature reference unit 10
h: Planck constant $(6.626 \times 10^{-34}$ Js$)$
c: light speed [m/s]
$\Delta v_0$: Raman shift wave number [/m] of temperature reference unit 10
k: Boltzmann constant $(1.38 \times 10^{-23}$ JK$^{-1})$
R(T): ratio (Ias/Ist) of anti-Stokes light Ias and Stokes light Ist at to-be-measured point
$R(T_0)$: ratio (Ias/Ist) of anti-Stokes light Ias and Stokes light Ist at temperature reference unit 10

By the above configuration, in principle, the temperature and light intensity of the temperature reference unit 10 are measured to obtain a temperature of any point on the optical fiber 3.

In the actual measurement, a wavelength of the light source 1, a characteristic of the optical filter 4, characteristics of the O/E converters 5st, 5as, an error of the reference thermometer 12, characteristics of connector connection point/melting connection point, a characteristic of each optical fiber 3 and the like are changed and are different for each device/component, so that it is necessary to consider the same so as to measure the temperature with high precision.

Therefore, for example, an apparatus disclosed in Patent Document 1 is configured to correct a shift wave number relating to a temperature offset and a temperature magnification, based on equations (2) and (3), thereby obtaining a temperature $T_c$ of high precision.

$$Tc = \Delta v \times \frac{1}{\frac{\Delta v_0}{T} - \frac{\Delta v_0}{T'_1} + \frac{\Delta v}{T_1}} \quad (2)$$

$$\Delta v = \Delta v_0 \times \frac{(T'_2 - T'_1)(T_1 \times T_2)}{(T_2 - T_1)(T'_1 \times T'_2)} \quad (3)$$

T: temperature [K] of to-be-measured point before calibration
$T_c$: temperature [K] of to-be-measured point after calibration
$T_1$: reference temperature value (true value) [K] measured at the reference thermometer 12
$T_2$: reference temperature value (true value) [K] measured at the reference thermometer 12
$T'_1$: temperature value [K] measured by the apparatus before correction at the time of reference temperature $T_1$
$T'_2$: temperature value [K] measured by the apparatus before correction at the time of reference temperature $T_2$
$\Delta v_0$: Raman shift wave number [/m] of the temperature reference unit 10
$\Delta v$: true Raman shift wave number [/m] of to-be-measured optical fiber 3

In fact, it is necessary to consider a loss difference in a longitudinal direction of the to-be-measured optical fiber 3 due to a wavelength difference between the Stokes light and the anti-Stokes light, in addition to the temperature offset $T'_1$ and the shift wave number $\Delta v$. When a correction formula considering the loss difference in the longitudinal direction of the to-be-measured optical fiber 3 is rewritten from the equation (1), a following equation (4) is obtained.

$$T = \frac{hc\Delta v_0}{k} \left( \frac{1}{-\ell n R(T, L) + \ell n\left(10^{\frac{aL}{5}}\right) + \ell n R(T_0) + \frac{hc\Delta v_0}{k} \cdot \frac{1}{T_0}} \right) \quad (4)$$

L: distance [m] from an emission end of the apparatus to a to-be-measured point
R(T, L): ratio (Ias/Ist) of anti-Stokes light Ias and Stokes light Ist at a to-be-measured point of any distance L
a: correction value [dB/km] of the difference between losses of Stokes light and anti-Stokes light In the equation (4), a temperature error is generated in the longitudinal direction of the to-be-measured optical fiber 3 unless the correction value a is properly set. However, a true correction value a may be different for each fiber. In the meantime, it is assumed that the fiber of the temperature reference unit 10 has been already properly corrected.

As clearly seen from the above, when calibrating the temperature, it is necessary to correctly obtain the three parameters, i.e., the temperature offset $T'_1$, the shift wave number $\Delta v$ and the loss difference a. In order to obtain the calibration parameters, three or more points of the already known temperatures (true values) in the to-be-measured optical fiber 3 are required.

Figure 7A:
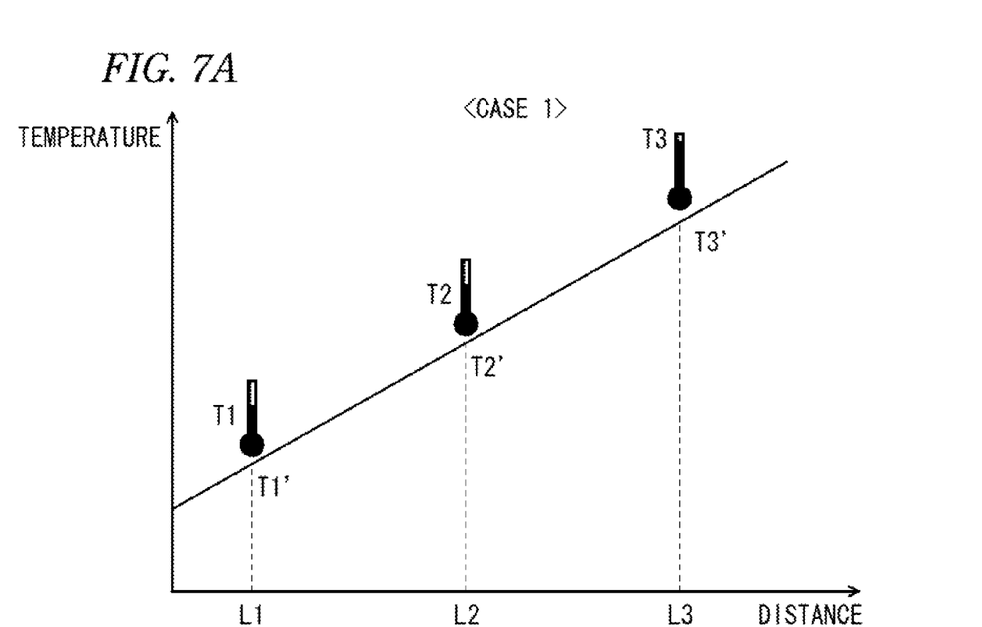
FIGS. 7A and 7B show pattern examples of three-point temperature calibration.
Figure 7B:
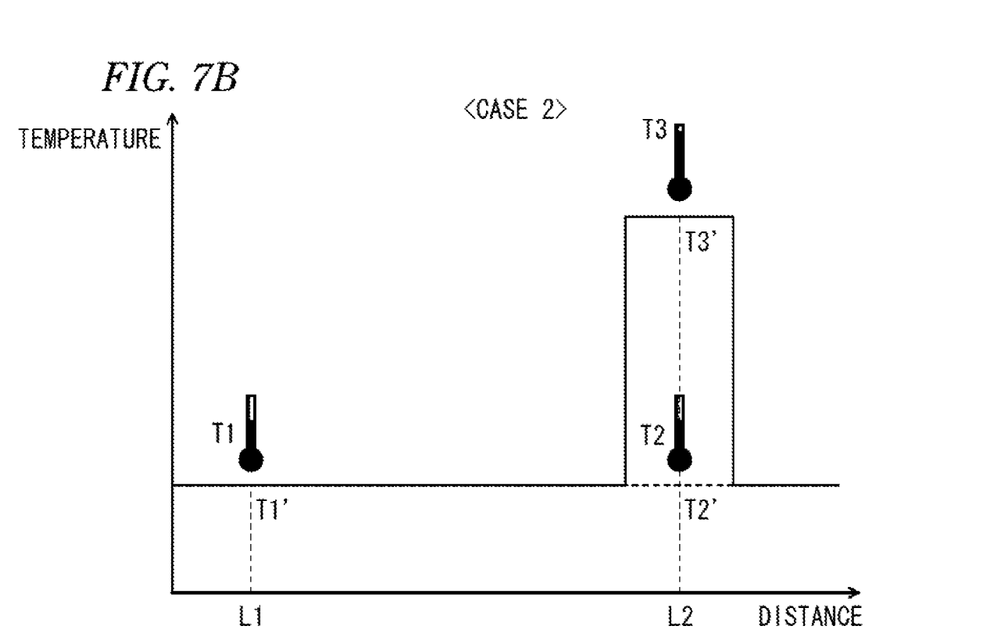

FIG. 7 shows a pattern example of three-point temperature calibration. When temperature three points ($T_1$, $T_2$, $T_3$) are already known, two cases of a case 1 shown in FIG. 7A and a case 2 shown in FIG. 7B are considered as a calibratable pattern.

The case 1 shown in FIG. 7A is a case where positions of the already-known temperature three points are all different and two or more temperatures of the three points are different. The case 2 shown in FIG. 7B is a case where two or more positions of the already-known temperature three points are different and temperatures of two points at the same position are different.

Figure 8:
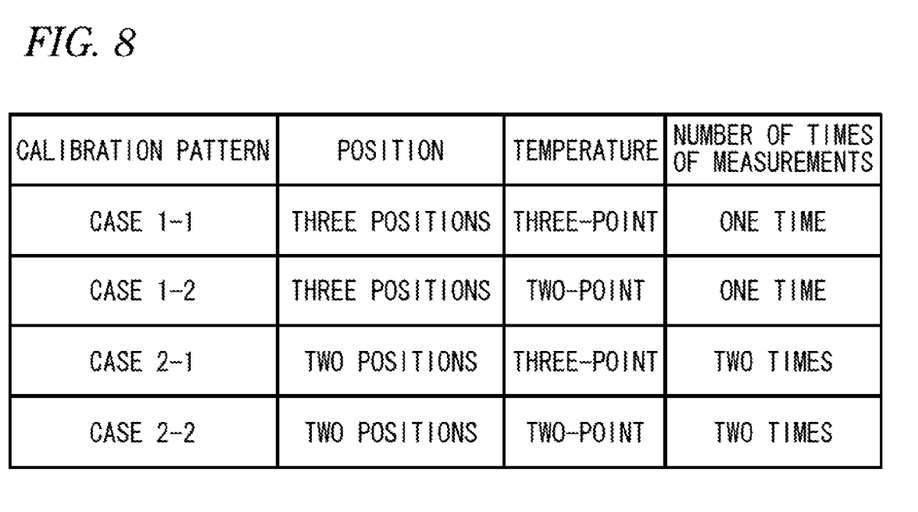
FIG. 8 is a specific classification table of three-point temperature calibration patterns.

FIG. 8 is a detailed classification table of the three-point temperature calibration pattern. As shown in FIG. 8, the temperature is measured at least one tune in the case 1. However, in the case 2, the temperature is measured at least two times while changing the temperature of the to-be-measured optical fiber 3. The cases 1 and 2 can be subdivided into cases 1-1, 1-2 and cases 2-1, 2-2, respectively.

In the related art, the temperature calibration is individually performed for each of the temperature offset $T'_1$, the shift wave number $\Delta v$ and the loss difference a.

However, since the three calibration parameters depend on one another, it is necessary to perform the calibration while incrementally constructing an environment wherein they do not depend on the other parameters.

Figure 9A:
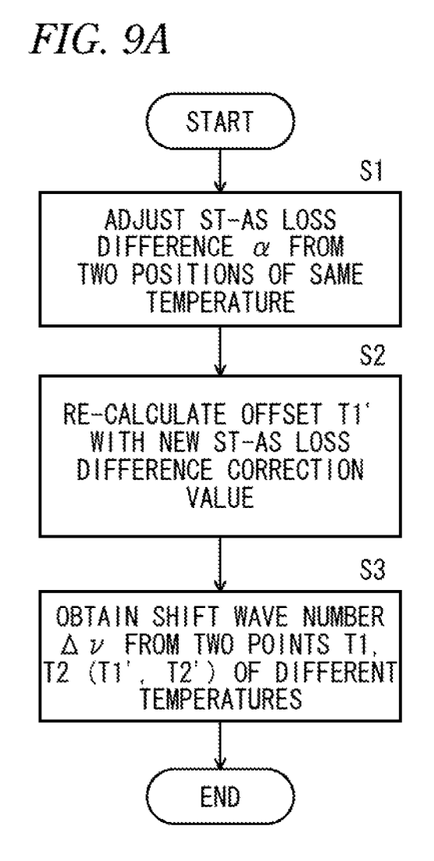
FIGS. 9A and 9B are flowcharts showing an example of a temperature calibration sequence that is performed in the optical fiber temperature distribution measuring device of the related art.
Figure 9B:
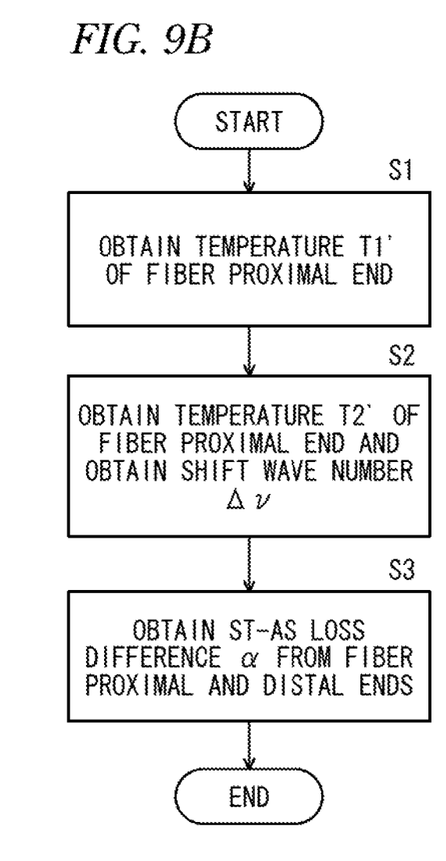

FIGS. 9A and 9B are flowcharts showing examples of a temperature calibration sequence of the optical fiber temperature distribution measuring device, which is performed in the related art.

In the FIG. 9A, the loss difference a is first adjusted (step S1). When adjusting the loss difference a, the temperature of the different position should be already known, and when calculating the net loss difference a, the temperatures of the two positions should be made to be the same so as to exclude the influence of the shift wave number Δv. Actually, there are very few cases where it is possible to construct an environment in which the temperatures of the two positions are the same.

When the accurate loss difference a is obtained in this way, the temperature offset $T'_1$ relative to the reference temperature $T_1$ at the accurate loss difference a is recalculated on the basis of the equation (4) (step S2).

When the other already-known reference temperature $T_2$ and the value $T'_2$ measured by the optical fiber temperature distribution measuring device are obtained, it is possible to obtain the accurate shift wave number Δv based on the equation (3) (step S3).

The calibrated temperature $T_c$ at any to-be-measured point can be obtained from the equation (2). According to the calibration sequence of FIG. 9A, the calibration can be made in the patterns of the case 1-2 and the case 2-2 shown in FIG. 8.

In FIG. 9B, the shift wave number Δv is first adjusted. In order to obtain the accurate shift wave number Δv, it is necessary to measure the temperature two times while changing the temperature in a fiber proximal end at which it is possible to substantially neglect the influence of the loss difference a. It is possible to obtain the accurate shift wave number Δv based on the equation (3) from the parameters $T_1$, $T_2$ ($T'_1$, $T'_2$) of two points having different temperatures (steps S1, S2).

Thereby, the fiber proximal end is temperature-calibrated with the equation (2). When the accurate shift wave number Δv and temperature offset of the to-be-measured optical fiber 3 are obtained, the loss difference a is corrected from the already-known reference temperature $T_3$ of one position (preferably, a fiber distal end) by adjusting the temperature $T'_3$ measured by the optical fiber temperature distribution measuring device to be the same as the reference temperature $T_3$ (step S3).

According to the calibration sequence of FIG. 9B, the calibration can be made only in the pattern of the case 2-2 shown in FIG. 8, on condition that the temperature is changed in the fiber proximal end.

Patent Document 1: Japanese Patent Application Publication No. 2012-27001A

However, according to the temperature calibration based on the configurations of the related art, the three calibration parameters, i.e., 1) the shift wave number, 2) the loss difference between the Stokes light ST and the anti-Stokes light AS, and 3) the offset should be sequentially calibrated. As a result, the operation efficiency is very poor.

Also, since the respective calibration parameters depend on one another, it is necessary to construct an environment where it is possible to exclude the influences of the other parameters. Therefore, the calibratable patterns are highly limited.

SUMMARY

Exemplary embodiments of the invention provide an optical fiber temperature distribution measuring device capable of obtaining optimal values of respective calibration parameters at one time from a measured temperature and a reference temperature without being conscious of a calibration sequence to thereby improve the operation efficiency of temperature calibration and solving a limitation on a calibratable pattern caused due to mutual dependence of the respective calibration parameters to thus perform the temperature calibration in a variety of calibration patterns.

An optical fiber temperature distribution measuring device, according to an exemplary embodiment of the invention, which measures a temperature distribution along an optical fiber by using backward Raman scattering light generated in the optical fiber, comprises:

an arithmetic controller that changes a plurality of calibration parameters in conjunction with each other on the basis of a measured temperature value and a reference temperature value at a to-be-measured point, thereby converging a calibrated value of the measured temperature to a true value.

The calibration parameters may be three parameters of a temperature offset, a shift wave number and a loss difference in a longitudinal direction of the optical fiber due to a wavelength difference between Stokes light and anti-Stokes light.

An optical fiber temperature distribution measuring device, according to an exemplary embodiment of the invention, which measures a temperature distribution along an optical fiber by using backward Raman scattering light generated in the optical fiber, comprises:

An arithmetic controller that solves a simultaneous equation on the basis of a measured temperature value and a reference temperature value at a to-be-measured point, thereby obtaining exact solutions of all calibration parameters.

According to the present invention, it is possible to provide the optical fiber temperature distribution measuring device capable of effectively performing the temperature calibration in the various calibration patterns.

DETAILED DESCRIPTION

Figure 1:
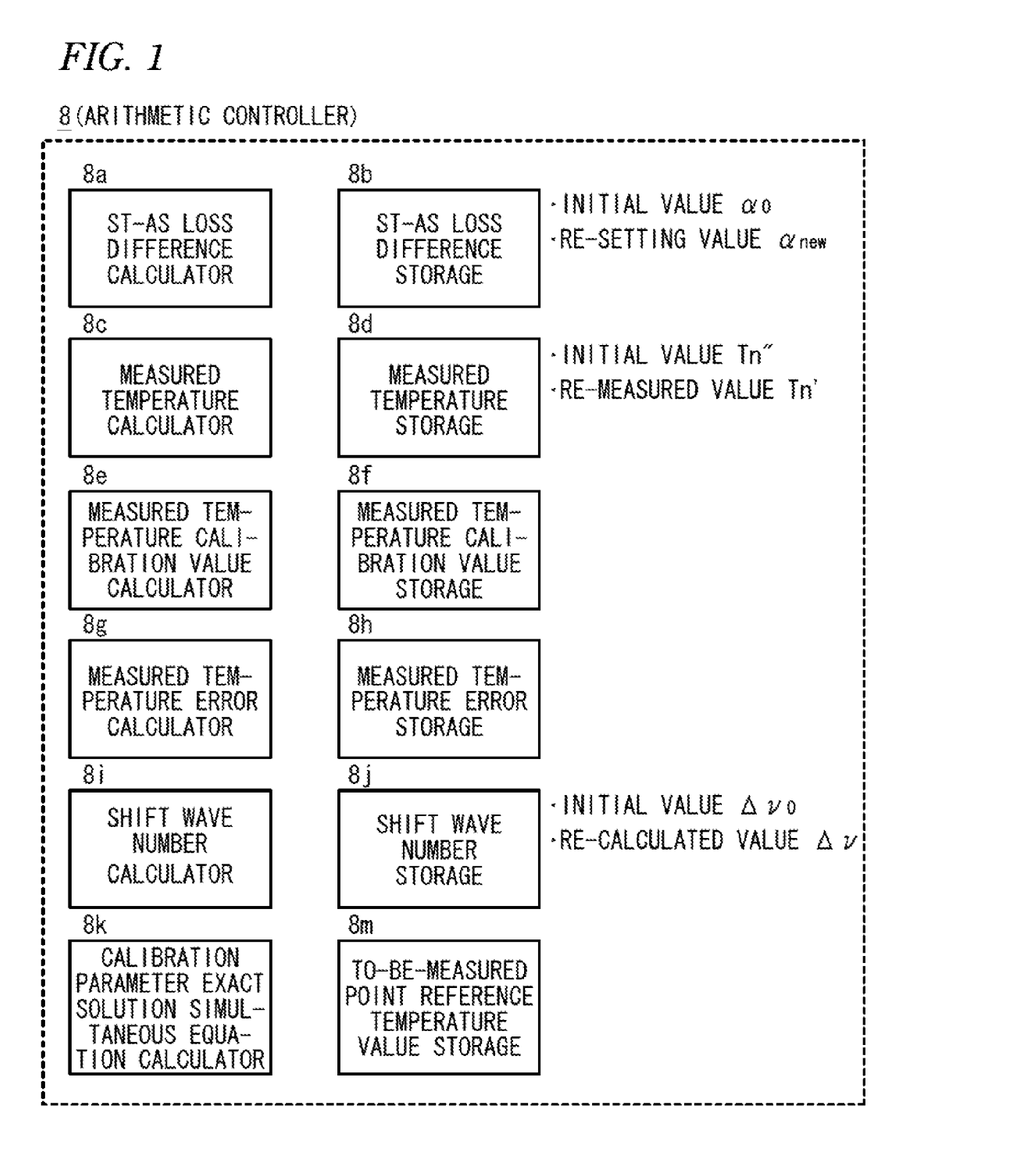
FIG. 1 is a block diagram showing a specific configuration example of an arithmetic controller 8 that is used in the present invention.

Hereinafter, an exemplary embodiment of the present invention will be described with reference to the drawings. The elements or members other than the arithmetic controller in the optical fiber temperature distribution measuring device are the same as those of the related art and thus the description thereof will be omitted. FIG. 1 is a block diagram showing a specific configuration example of an arithmetic controller 8 that is used in the present invention. The arithmetic controller 8 has an ST-AS loss difference calculator 8a configured to calculate a loss difference in a longitudinal direction of an optical fiber due to a wavelength difference between Stokes light ST and anti-Stokes light AS, an ST-AS loss difference storage 8b configured to store therein a calculation result of the ST-AS loss difference calculator 8a, a measured temperature calculator 8c configured to calculate a measured temperature on the basis of a predetermined calculation equation, a measured temperature storage 8d configured to store therein a calculation result of the measured temperature calculator 8c, a measured temperature calibration value calculator 8e configured to calculate a calibration value of the measured temperature on the basis of a predetermined calculation equation, a measured temperature calibration value storage 8f configured to store therein a calculation result of the measured temperature calibration value calculator 8e, a measured temperature error calculator 8g configured to calculate a difference between the calculation result of the measured temperature calculator 8c and the calculation result of the measured temperature calibration value storage 8f, a measured temperature error storage 8h configured to store therein a calculation result of the measured temperature error calculator 8g, a shift wave number calculator 8i configured to calculate a shift wave number on the basis of a predetermined calculation equation, a shift wave number storage 8j configured to store therein a calculation result of the shift wave number calculator 8i, a calibration parameter exact solution simultaneous equation calculator 8k configured to calculate a predetermined simultaneous equation for obtaining exact solutions of all calibration parameters, and a to-be-measured point reference temperature value storage 8m configured to store therein a reference temperature value Tn of a to-be-measured point Ln, which is measured in advance by other temperature measuring means.

Following two methods are considered as regards a method of obtaining an exact solution of a calibration parameter.

1) A method of changing calibration parameters in conjunction with each other and converging the same to true values (hereinafter, referred to as calibration parameter adjuster method)

2) A method of obtaining exact solutions by using calculation equations deduced from a simultaneous equation (hereinafter, referred to as calibration method by a simultaneous equation)

1) Calibration Parameter Adjuster Method

The calibration parameter adjuster method is a method of monitoring a difference between a calibrated temperature, which is obtained by changing a loss difference, which is one of calibration parameters, and changing a shift wave number and an offset in conjunction with the same, and a true value (reference temperature), and converging the difference to zero (0).

Figure 2:
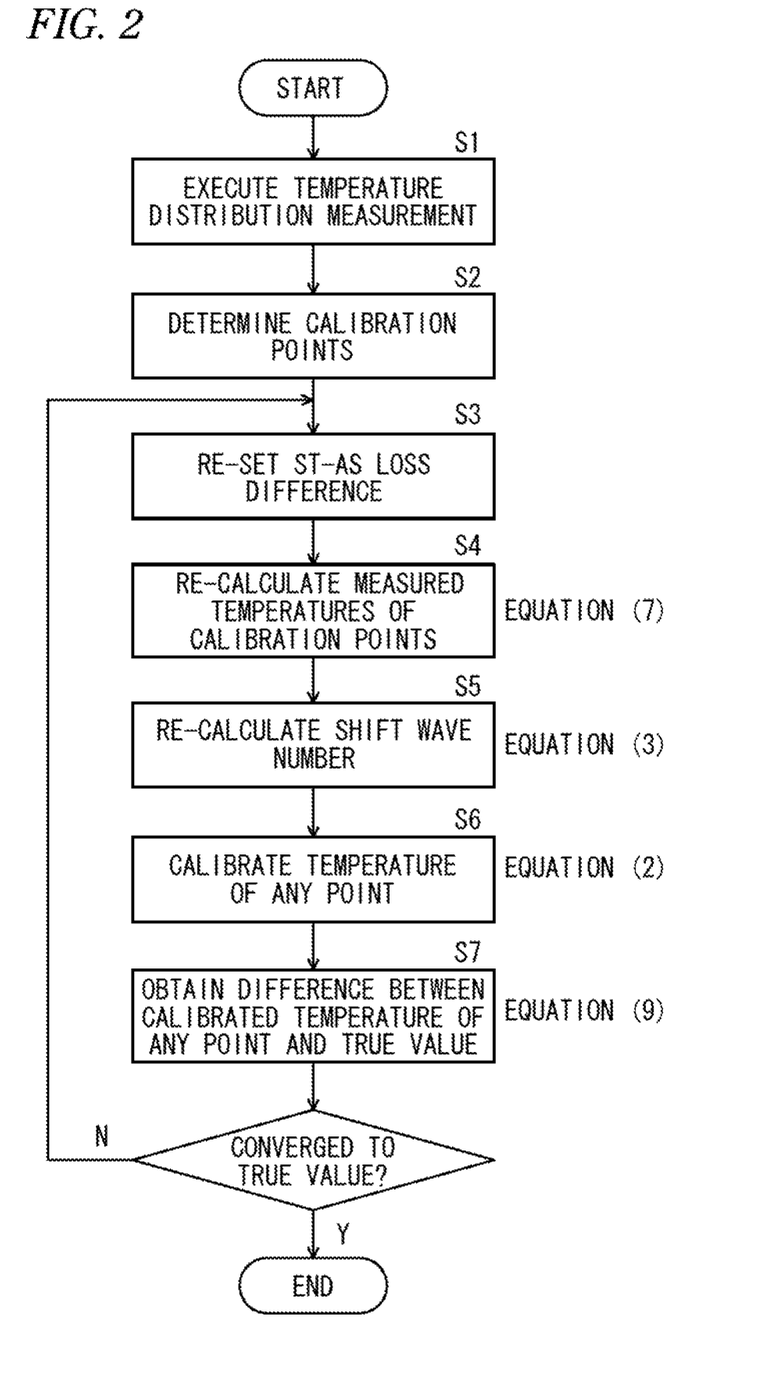
FIG. 2 is a flowchart showing a specific example of temperature measuring processing based on a calibration parameter adjuster method.

FIG. 2 is a flowchart showing a specific example of temperature measuring processing based on the calibration parameter adjuster method.

First, the temperature distribution measurement is performed in accordance with the calibration patterns shown in FIG. 8 (step S1), and calibration points of at least three positions are determined (step S2).

Subsequently, it is considered to change the loss difference between the Stokes light AS and the anti-Stokes light AS (step S3). In order to change the loss difference, a loss difference correction of a measured temperature value T"n of a to-be-measured point Ln when the loss difference between the Stokes light ST and the anti-Stokes light is corrected with an initial value $a_0$ is once invalidated and an equation for obtaining a temperature T'n corrected with a new loss difference $a_{new}$ is required.

The measured temperature value T"n corrected with the initial value $a_0$ can be expressed by a following equation, from the equation (1).

$$\frac{hc\Delta v_0}{kT''n} = -\ell nR(Tn, Ln) - \ell n\left(10^{\frac{a_0 L_n}{5}}\right) + \ell nR(T_0) + \frac{hc\Delta v_0}{kT_0} \quad (5)$$

$a_0$: initial value of difference between losses of Stokes light ST and anti-Stokes light AS
T"n: temperature distribution measured value [K] of to-be-measured point Ln at loss difference $a_0$ Also, the temperature T"n corrected with the new loss difference $a_{new}$ can also be expressed by a following equation, from the equation (4).

$$\frac{hc\Delta v_0}{kT'n} = -\ell nR(Tn, Ln) - \ell n\left(10^{\frac{a_{new} L_n}{5}}\right) + \ell nR(T_0) + \frac{hc\Delta v_0}{kT_0} \quad (6)$$

$a_{new}$: re-setting value [dB/km] of difference between losses of Stokes light ST and anti-Stokes light AS
T'n: temperature distribution measured value [K] of to-be-measured point Ln at loss difference $a_{new}$ By the above equations, a relation between T"n and T'n can be expressed by a following equation.

$$\frac{hc\Delta v_0}{kT'n} = \frac{hc\Delta v_0}{kT''n} + \ell n\left(10^{\frac{a_0 L_n}{5}}\right) - \ell n\left(10^{\frac{a_{new} L_n}{5}}\right) \quad (7)$$

When the equation (7) is deformed as regards T'n, a following equation (8) is obtained.

$$T'n = \frac{hc\Delta v_0}{k}\left(\frac{1}{\frac{hc\Delta v_0}{kT''_n} + \ell n\left(10^{\frac{a_0 L_n}{5}}\right) - \ell n\left(10^{\frac{a_{new} L_n}{5}}\right)}\right) \quad (8)$$

As can be clearly seen from the equation (8), when $a_{new}$ is changed, the temperature distribution measured value T'n of the to-be-measured point Ln is changed.

Therefore, since the temperature distribution measured values T'$_1$, T'$_2$ of calibration points $L_1$, $L_2$ are changed, the shift wave number is changed from the equation (3) (step S5).

Further, a calibrated temperature Tnc of the to-be-measured point Ln is changed from equation (2) (step S6).

$$Tnc = \Delta v \times \frac{1}{\frac{\Delta v_0}{T'n} - \frac{\Delta v_0}{T'_1} + \frac{\Delta v}{T_1}} \quad (9)$$

If a true temperature Tn of the to-be-measured point Ln, which is obtained as all the calibration parameters are changed in conjunction with each other, is already known, it is possible to obtain a difference $T_{error}$ between the true value Tn and the calibrated temperature Tnc from an equation (10) (step S7).

$$T_{error} = Tnc - Tn \quad (10)$$

The calculation is iteratively performed until the temperature error $T_{error}$ is equal to or smaller than a desired value, so that optimal values of all the calibration parameters are obtained. However, the temperature error becomes inevitably zero (0) at the two points of the calibration points $L_1$, $L_2$. Therefore, when one point reference temperature for comparison of the true value and the calibrated temperature is additionally provided, i.e., when reference temperatures of a total of three or more points are provided, the calibration can be performed.

2) Calibration Method by Simultaneous Equation

The calibration parameter adjuster method is a method of converging the calibrated value to the true value while changing all the calibration parameters in conjunction with each other. In the meantime, where there are three points of the already-known temperatures, it is possible to obtain exact solutions of all the calibration parameters by solving a simultaneous equation.

First, a relation between the measured temperature T"n corrected with the loss difference $a_0$ of the to-be-measured point Ln and the temperature T'n at which the loss difference $a_0$ correction is invalidated is expressed by a following equation (11).

$$\frac{hc\Delta v_0}{kT'n} = \frac{hc\Delta v_0}{kT''n} + \ell n\left(10^{\frac{a_0 Ln}{5}}\right) = -\ell nR(Tn, Ln) + \ell nR(T_0) + \frac{hc\Delta v_0}{kT_0} \quad (11)$$

From the equation (11), three to-be-measured points can be expressed by $G_1$ to $G_3$ of a following equation (12).

$$G_1 = \frac{hc\Delta v_0}{kT'_1} = -\ell nR(T_1, L_1) + \ell nR(T_0) + \frac{hc\Delta v_0}{kT_0} \quad (12)$$

$$G_2 = \frac{hc\Delta v_0}{kT'_2} = -\ell nR(T_2, L_2) + \ell nR(T_0) + \frac{hc\Delta v_0}{kT_0}$$

$$G_3 = \frac{hc\Delta v_0}{kT'_3} = -\ell nR(T_3, L_3) + \ell nR(T_0) + \frac{hc\Delta v_0}{kT_0}$$

$T'_1$: temperature distribution measured value [K] of to-be-measured point $L_1$
$T'_2$: temperature distribution measured value [K] of to-be-measured point $L_2$
$T'_3$: temperature distribution measured value [K] of to-be-measured point $L_3$
$T_1$: reference temperature value (true value) [K] of to-be-measured point $L_1$
$T_2$: reference temperature value (true value) [K] of to-be-measured point $L_2$
$T_3$: reference temperature value (true value) [K] of to-be-measured point $L_3$ The shift wave number can be expressed by a following equation using the temperature distribution measured values $T'_1$, $T'_2$ of the to-be-measured points $L_1$, $L_2$, the reference temperature values and the true loss difference a, from the equations (3) and (12).

$$\Delta v = \Delta v_0 \times \frac{(T'_2 - T'_1)(T_1 \times T_2)}{(T_2 - T_1)(T'_1 \times T'_2)} = \quad (13)$$

$$\frac{(T_1 \times T_2)}{(T_2 - T_1)}\left(\frac{k}{hc}\right)\left\{G_1 - G_2 + \ell n\left(10^{\frac{a(L_2-L_1)}{5}}\right)\right\}$$

a: true difference [dB/km] of losses of Stokes light ST and anti-Stokes light AS Likewise, the shift wave number can be expressed by a following equation using the temperature distribution measured values $T'_1$, $T'_3$ of the to-be-measured points $L_1$, $L_3$, the reference temperature values and the true loss difference a.

$$\Delta v = \Delta v_0 \times \frac{(T'_3 - T'_1)(T_1 \times T_3)}{(T_3 - T_1)(T'_1 \times T'_3)} = \quad (14)$$

$$\frac{(T_1 \times T_3)}{(T_3 - T_1)}\left(\frac{k}{hc}\right)\left\{G_1 - G_3 + \ell n\left(10^{\frac{a(L_3-L_1)}{5}}\right)\right\}$$

When the shift wave numbers of the equations (13) and (14) are the same.

$$\frac{(T_1 \times T_2)}{(T_2 - T_1)}\left(\frac{k}{hc}\right)\left\{G_1 - G_2 + \ell n\left(10^{\frac{a(L_2-L_1)}{5}}\right)\right\} =$$

$$\frac{(T_1 \times T_3)}{(T_3 - T_1)}\left(\frac{k}{hc}\right)\left\{G_1 - G_3 + \ell n\left(10^{\frac{a(L_3-L_1)}{5}}\right)\right\}$$

Then, when the above equation is organized and deformed into an equation for obtaining the true loss difference a between the Stokes light ST and the anti-Stokes light AS, a following equation is obtained.

$$\alpha = \frac{5\left\{(G_3 - G_1) - \left(\frac{T_1 - T_3}{T_3}\right)\left(\frac{T_2}{T_2 - T_1}\right)(G_1 - G_2)\right\}}{l(10)\left\{(L_3 - L_1) + \left(\frac{T_1 - T_3}{T_3}\right)\left(\frac{T_2}{T_2 - T_1}\right)(L_2 - L_1)\right\}} \quad (15)$$

The temperature offset $T'_1$ can be expressed by a following equation using the true loss difference a between the Stokes light ST and the anti-Stokes light AS.

$$T'_1 = \frac{hc\Delta v_0}{k}\left\{\frac{1}{G_1 - \ell n\left(10^{\frac{aL_1}{5}}\right)}\right\} \quad (16)$$

In this way, it is possible to obtain the shift wave number by the equation (13) or (14), to obtain the loss difference by the equation (15) and to obtain the temperature offset by the equation (16).

By using the calibration parameter adjuster method or calibration method by a simultaneous equation based on the present invention, it is possible to obtain the optimal values of the calibration parameters (the shift wave number, the loss difference between the Stokes light ST and the anti-Stokes light AS and the temperature offset) at one time on the basis of the already-known temperature three points and the measuring result of the temperature distribution measurement, without being conscious of the calibration sequence.

Thereby, it is not necessary to construct a special calibration environment and to alternately execute the temperature distribution measurement and the calibration calculation, which can remarkably improve the operation efficiency.

Also, it is possible to perform the proper calibration even for the various calibration patterns as shown in FIG. 8, which are considered to be impossible with the method of the related art due to the mutual dependence of the calibration parameters.

Figure 3:
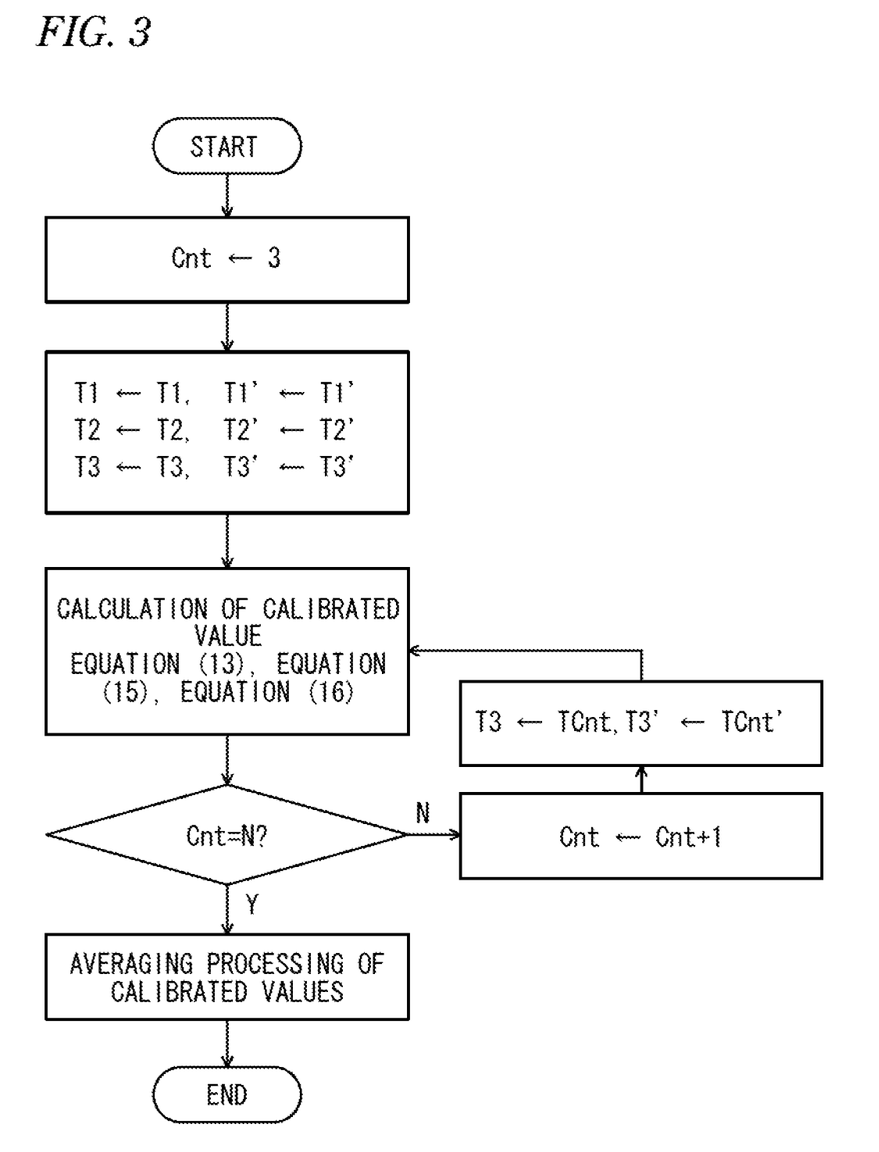
FIG. 3 shows a temperature calibration flow that is executed when temperatures of N points (three points or more) are already known.

In the meantime, the temperature calibration can be performed even in a case where temperatures of N points (three or more points) are already known. FIG. 3 shows a temperature calibration flow that is executed when temperatures of N points (three points or more) are already known. In the calibration parameter adjuster method, the adjustment is preferably made so that the temperature error $T_{error}$ of N points is minimized.

In the calibration method by the simultaneous equation, the measured temperature of the temperature distribution and the reference temperature after the third point and thereafter are substituted as $T'_3$, $T_3$ in the calculation equation, as shown in FIG. 3, and the calibrated values of the respective calibration parameters are finally averaged.

In order to calibrate all the calibration parameters (the shift wave number, the loss difference and the temperature offset), the reference temperatures of three or more points are required. However, when any one of the shift wave number and the loss difference is already known, it is possible to obtain the calibrated value if there are the reference temperatures of two points.

Figure 4A:
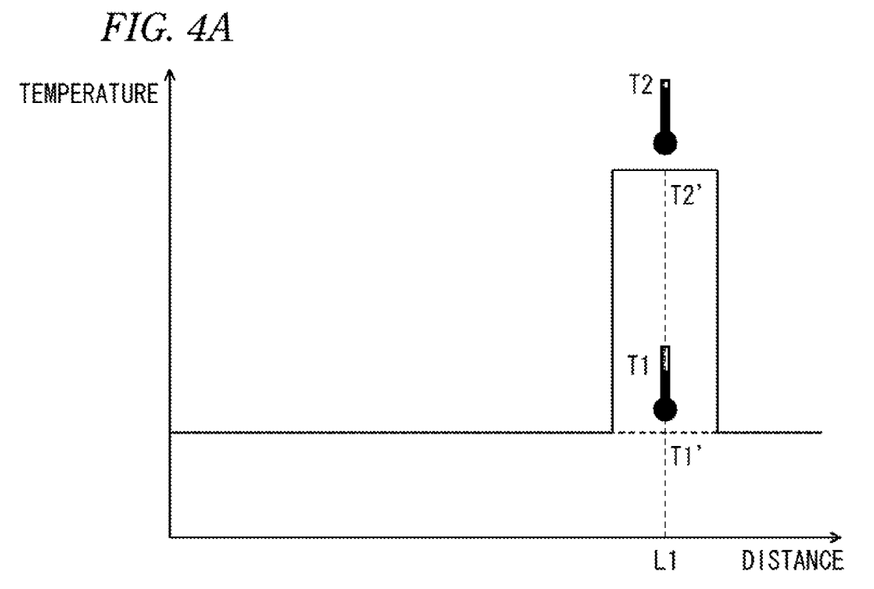
FIGS. 4A and 4B illustrate calibration patterns when there are reference temperatures of two points.

FIGS. 4A and 4B illustrate calibration patterns when there are the reference temperatures of two points. In a case 1 shown in FIG. 4A, when any one of the shift wave number and the loss difference is already known, the calibration can be performed.

Figure 4B:
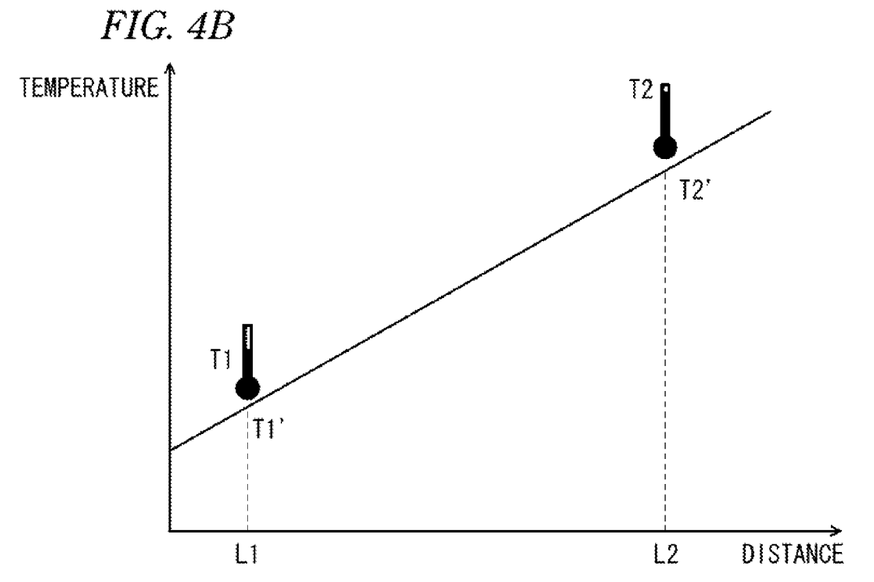

In a case 2 shown in FIG. 4B, when the loss difference is already known, the calibration can be performed. When the loss difference is already known, it is possible to obtain the shift wave number and the temperature offset by using the equations (13) and (16).

Also, when the shift wave number is already known, the equation (13) is preferably deformed into an equation of the loss difference a, like an equation (17). The temperature offset is obtained using the equation (16), as described above.

$$\alpha = \frac{5\left\{\Delta v\left(\frac{T_1 - T_2}{T_2 \times T_1}\right)\left(\frac{hc}{k}\right) + G_1 - G_2\right\}}{\ell n(10)(L_2 - L_1)} \quad (17)$$

The temperature calibration method of the Single-Ended measuring method in which the light pulse is enabled to be incident from one end of the to-be-measured fiber and the Raman scattering signal is received has been described. In contrast, a Double-Ended measuring method is a method of enabling the light pulse to be incident from both ends of the to-be-measured fiber and synthesizing the respective Raman scattering signals. This method has a feature that the Double-Ended Raman scattering signals are synthesized and the loss difference between the Stokes light ST and the anti-Stokes light AS, which is problematic in the Single-Ended measuring method, is thus cancelled.

In the Double-Ended measuring method, the calibration parameters are the shift wave number and the temperature offset. For this reason, in contrast to the Single-Ended measuring method, when the temperatures of two points are already known, it is possible to obtain the calibration value from the equation (3). As the calibratable pattern, the patterns shown in FIGS. 4A and 4B may be considered.

In the meantime, the calibration value may be obtained, like the calibration parameter adjuster method. The true shift wave number $\Delta v_{new}$ is changed from the equation (2), and the resultantly obtained calibrated temperature Tnc and the reference temperature are compared to converge the calibrated value to the true value.

$$Tnc = \Delta v_{new} \times \frac{1}{\frac{\Delta v_0}{T'n} - \frac{\Delta v_0}{T'_1} + \frac{\Delta v}{T_1}} \quad (18)$$

Also, the specific functional block configuration example of the arithmetic controller 8 is shown in FIG. 1. The functional blocks may be implemented only by the hardware or only by the software or may be partially combined by the hardware and the software.

As described above, according to the present invention, it is possible to obtain the optimal values of all the calibration parameters at one time from the measurement results, without being conscious of the temperature calibration sequence.

Also, it is possible to perform the proper calibration even for all the calibration patterns including the calibration patterns, which cannot be calibrated with the method of the related.

Further, it is possible to cope with any calibration of the Single-Ended measuring method and the Double-Ended measuring method.

What is claimed is:

1. An optical fiber temperature distribution measuring device which measures a temperature distribution along an optical fiber by using backward Raman scattering light generated in the optical fiber, the device comprising:
    an arithmetic controller that changes a plurality of calibration parameters in conjunction with each other on the basis of a measured temperature value and a reference temperature value at a to-be-measured point, thereby converging a calibrated value of the measured temperature to the reference temperature value based on a loss difference of Stokes light and anti-Stokes light in a longitudinal direction of the optical fiber.

2. The optical fiber temperature distribution measuring device according to claim 1, wherein the calibration parameters are three parameters of a temperature offset, a shift wave number and the loss difference in the longitudinal direction of the optical fiber due to a wavelength difference between Stokes light and anti-Stokes light,
    wherein the calibrated value is obtained by changing the loss difference and changing the shift wave number and the temperature offset in conjunction with the same.

3. An optical fiber temperature distribution measuring device which measures a temperature distribution along an optical fiber by using backward Raman scattering light generated in the optical fiber, the device comprising:
    an arithmetic controller that solves a simultaneous equation on the basis of a measured temperature value and a reference temperature value at a to-be-measured point, thereby obtaining exact solutions of all calibration parameters,
    wherein the optical fiber temperature distribution measuring device obtains optimal values of a shift wave number, a loss difference between Stokes light and anti-Stokes light, and a temperature offset, based on the measured temperature value and the reference temperature value at three to-be-measured points and a true loss difference.

4. The optical fiber temperature distribution measuring device according to claim 1, wherein the calibrated value of the measured temperature is re-calculated and converged to the true value until a difference between the measured temperature and the reference temperature value is equal to or smaller than a desired value.

5. An optical fiber temperature distribution measuring device which measures a temperature distribution along an optical fiber by using backward Raman scattering light generated in the optical fiber, the device comprising:
an arithmetic controller that changes a plurality of calibration parameters in conjunction with each other on the basis of a measured temperature value and a reference temperature value at a to-be-measured point, thereby converging a calibrated value of the measured temperature to a true value based on a loss difference in a longitudinal direction of the optical fiber, wherein the measured temperature is re-calculated in view of the loss difference based on:

$$\frac{hc\Delta v_0}{kT'n} = -\ln R(Tn, Ln) - \ln\left(10^{\frac{\alpha_{new}L_n}{5}}\right) + \ln R(T_0) + \frac{hc\Delta v_0}{kT_0},$$

wherein:
h: Planck constant ($6.626\times10^{-34}$ Js),
c: light speed [m/s],
$\Delta v_0$: Raman shift wave number [/m] of temperature reference unit,
k: Boltzmann constant ($1.38\times10^{-23}$ JK$^{-1}$),
$\alpha_{new}$: re-setting value [dB/km] of difference between losses of Stokes light ST and anti-Stokes light AS,
T'n: temperature distribution measured value [K] of to-be-measured point Ln at loss difference $a_{new}$,
$T_0$: temperature [K] of temperature reference unit,
R(T, L): ratio (Ias/Ist) of anti-Stokes light Ias and Stokes light Ist at a to-be-measured point of any distance L,
R($T_0$): ratio (Ias/Ist) of anti-Stokes light Ias and Stokes light Ist at temperature reference unit,
L: distance [m] from an emission end of the apparatus to a to-be-measured point.

6. The optical fiber temperature distribution measuring device according to claim 3, wherein the simultaneous equation comprises:

$$\Delta v =$$

$$\Delta v_0 \times \frac{(T'_3 - T'_1)(T_1 \times T_3)}{(T_3 - T_1)(T'_1 \times T'_3)} = \frac{(T_1 \times T_3)}{(T_3 - T_1)}\left(\frac{k}{hc}\right)\left\{G_1 - G_3 + \ln\left(10^{\frac{\alpha(L_3-L_1)}{5}}\right)\right\}$$

$$\alpha = \frac{5\left\{(G_3 - G_1) - \left(\frac{T_1 - T_3}{T_3}\right)\left(\frac{T_2}{T_2 - T_1}\right)(G_1 - G_2)\right\}}{l(10)\left\{(L_3 - L_1) + \left(\frac{T_1 - T_3}{T_3}\right)\left(\frac{T_2}{T_2 - T_1}\right)(L_2 - L_1)\right\}}$$

$$T'_1 = \frac{hc\Delta v_0}{k}\left\{\frac{1}{G_1 - \ln\left(10^{\frac{\alpha L_1}{5}}\right)}\right\},$$

wherein:
h: Planck constant ($6.626\times10^{-34}$ Js),
c: light speed [m/s],
$\Delta v_0$: Raman shift wave number [/m] of temperature reference unit,
k: Boltzmann constant ($1.38\times10^{-23}$ JK$^{-1}$),
α: true difference [dB/km] of losses of Stokes light ST and anti-Stokes light AS,
$L_n$: distance [m] from an emission end of the apparatus to a to-be-measured point,
$G_n$:

$$G_n = \frac{hc\Delta v_0}{kT'n} = -\ln R(T_n, L_n) + \ln R(T_0) + \frac{hc\Delta v_0}{kT_0},$$

$T_1$: temperature distribution measured value [K] of to-be-measured point $L_1$,
$T'_3$: temperature distribution measured value [K] of to-be-measured point $L_3$,
$T_1$: reference temperature value (true value) [K] of to-be-measured point $L_1$,
$T_2$: reference temperature value (true value) [K] of to-be-measured point $L_2$,
$T_3$: reference temperature value (true value) [K] of to-be-measured point $L_3$.

7. The optical fiber temperature distribution measuring device according to claim 1, where the arithmetic controller iteratively changes the plurality of calibration parameters, including the loss difference in the longitudinal direction of the optical fiber due to a wavelength difference between Stokes light and anti-Stokes light, in conjunction with each other on the basis of the measured temperature value and the reference temperature value at the to-be-measured point, thereby re-calculating and converging the calibrated value of the measured temperature to the reference temperature value.

8. The optical fiber temperature distribution measuring device according to claim 3, wherein the simultaneous equation comprises calibration parameters including a temperature offset, a shift wave number, and the loss difference in the longitudinal direction of the optical fiber due to a wavelength difference between Stokes light and anti-Stokes light.

* * * * *